(12) United States Patent
Kafai et al.

(10) Patent No.: US 11,080,301 B2
(45) Date of Patent: Aug. 3, 2021

(54) STORAGE ALLOCATION BASED ON SECURE DATA COMPARISONS VIA MULTIPLE INTERMEDIARIES

(71) Applicant: Hewlett Packard Enterprise Development LP, Houston, TX (US)

(72) Inventors: Mehran Kafai, Redwood City, CA (US); Manav Das, Chicago, IL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 747 days.

(21) Appl. No.: 15/278,253

(22) Filed: Sep. 28, 2016

(65) Prior Publication Data
US 2018/0089301 A1    Mar. 29, 2018

(51) Int. Cl.
| G06F 16/28 | (2019.01) |
| G06F 21/60 | (2013.01) |
| G06F 21/78 | (2013.01) |

(52) U.S. Cl.
CPC .......... *G06F 16/285* (2019.01); *G06F 21/602* (2013.01); *G06F 21/78* (2013.01)

(58) Field of Classification Search
CPC ....... G06F 16/285; G06F 21/602; G06F 21/78
See application file for complete search history.

(56) References Cited

U.S. PATENT DOCUMENTS 4,261,043 A    4/1981 Robinson et al.
4,751,742 A    6/1988 Meeker
(Continued)

FOREIGN PATENT DOCUMENTS

EP    1072982 A2    1/2001
EP    1521210 B1    11/2009
(Continued)

OTHER PUBLICATIONS

Wen et al., "Secure Multi-Party Comparing Protocol Based on Multi-Threshold Secret Sharing Scheme", 6th International Conference on Wireless Communications Networking and Mobile Computing (WiCOM), 2010.
(Continued)

*Primary Examiner* — Tamara T Kyle
*Assistant Examiner* — Lahcen Ennaji
(74) *Attorney, Agent, or Firm* — Hewlett Packard Enterprise Patent Department

(57) ABSTRACT

Storage allocation based on secure data comparisons is disclosed. One example is a system including a plurality of intermediaries, a data allocator and a plurality of storage containers. Each intermediary receives a request from the data allocator to identify a target storage container of the plurality of storage containers, for secure allocation of a data term. Each intermediary compares, for each storage container, the truncated data term with a collection of truncated candidate terms to select a representative term of the candidate terms, identifies the selected representative term to the storage container, receives a similarity profile from each storage container, where the similarity profile is representative of similarities between the truncated data term and terms in the storage container, and selects a candidate target storage container based on similarity profiles received from each storage container.

20 Claims, 8 Drawing Sheets

(56) References Cited

U.S. PATENT DOCUMENTS

| | | | |
|---|---|---|---|
| 6,263,334 | B1 | 7/2001 | Fayyad et al. |
| 6,374,266 | B1 | 4/2002 | Shnelvar |
| 6,931,408 | B2 | 8/2005 | Adams et al. |
| 7,337,168 | B1 | 2/2008 | Sigel et al. |
| 7,685,083 | B2 | 3/2010 | Fairweather |
| 7,725,444 | B2 | 5/2010 | Devarakonda et al. |
| 7,756,269 | B2 | 7/2010 | Hawkes et al. |
| 8,010,466 | B2 | 8/2011 | Patinkin |
| 8,010,782 | B2 | 8/2011 | Kerschbaum et al. |
| 8,041,706 | B2 | 10/2011 | Agrawal et al. |
| 8,103,824 | B2 | 1/2012 | Pollack et al. |
| 8,165,414 | B1* | 4/2012 | Yagnik ............... G06F 16/41 382/255 |
| 8,234,470 | B2 | 7/2012 | Tevis et al. |
| 8,515,964 | B2 | 8/2013 | Ravikumar et al. |
| 8,630,422 | B2 | 1/2014 | Gentry et al. |
| 8,805,793 | B2 | 8/2014 | Patiejunas et al. |
| 9,448,695 | B2 | 9/2016 | O'Brien-Strain et al. |
| 2002/0026438 | A1 | 2/2002 | Rjaibi et al. |
| 2003/0108242 | A1 | 6/2003 | Conant |
| 2003/0167263 | A1 | 9/2003 | Sasaki et al. |
| 2005/0033523 | A1 | 2/2005 | Abe et al. |
| 2005/0055345 | A1 | 3/2005 | Ripley |
| 2005/0086210 | A1 | 4/2005 | Kita et al. |
| 2006/0095521 | A1 | 5/2006 | Patinkin |
| 2007/0038602 | A1 | 2/2007 | Weyand et al. |
| 2007/0094511 | A1 | 4/2007 | Wilson et al. |
| 2008/0177810 | A1 | 7/2008 | Devarakonda et al. |
| 2008/0183682 | A1 | 7/2008 | Lang et al. |
| 2010/0017487 | A1 | 1/2010 | Patinkin |
| 2010/0177842 | A1 | 7/2010 | Chang et al. |
| 2010/0325095 | A1 | 12/2010 | Stephenson et al. |
| 2010/0325133 | A1 | 12/2010 | Rounthwaite et al. |
| 2011/0040820 | A1 | 2/2011 | Rane et al. |
| 2011/0145593 | A1 | 6/2011 | Auradkar et al. |
| 2011/0311042 | A1 | 12/2011 | Cheddad et al. |
| 2012/0137375 | A1 | 5/2012 | Ramachandran et al. |
| 2013/0031059 | A1* | 1/2013 | Ravikumar ........... G06F 16/325 707/667 |
| 2013/0097664 | A1 | 4/2013 | Herz et al. |
| 2013/0173917 | A1 | 7/2013 | Clifton et al. |
| 2013/0191329 | A1 | 7/2013 | Dozier et al. |
| 2013/0275752 | A1 | 10/2013 | Zhang et al. |
| 2014/0281578 | A1 | 9/2014 | Bennison |
| 2015/0057948 | A1 | 2/2015 | Reid et al. |
| 2015/0154418 | A1 | 6/2015 | Redberg |
| 2015/0205818 | A1* | 7/2015 | Darcy .................... G06F 3/06 707/822 |
| 2015/0278156 | A1 | 10/2015 | Ambai et al. |
| 2016/0247175 | A1 | 8/2016 | Milton et al. |
| 2016/0283574 | A1* | 9/2016 | Anderson ............ G06F 16/285 |

FOREIGN PATENT DOCUMENTS

| | | |
|---|---|---|
| EP | 2650798 | 10/2013 |
| WO | WO-2013062941 | 5/2013 |

OTHER PUBLICATIONS

Sun et al., "A New Hybrid Approach for Privacy Preserving Distributed Data Mining", IEICE Transactions on Information and Systems vol. E97-D, No. 4, Apr. 2014, pp. 876-883.

Shi et al., "Secure Two-Party Multi-Dimensional Vector Comparison Protocol", International Conference on Management and Service Science, 2009.

Sanders, R. E.; "Using the DB2 10.5 Multi-Temperature Data and Administration Feature with EMC Symmetrix FAST VP Storage-Tiering"; DBA Society; May 22, 2015; 29 pages.

International Search Report and Written Opinion received for PCT Patent Application No. PCT/US2015/028896, dated Jan. 29, 2016, 7 pages.

International Preliminary Report on Patentability received for PCT Patent Application No. PCT/US2015/028896, dated Nov. 16, 2017, 6 pages.

Hwang, Y et al., "A fast Nearest Neighbour Search Algorithm by Nonlinear Embedding", Jun. 13, 2012; 8 pages.

Beis, J.S. et al, "Shape Indexing Using Approximate Nearest-Neighbor Search in High-Dimensional Spaces", Nov. 9, 2005.

He, K. et al, "Computing Nearest-Neighbor Fields via Propagation—Assisted KD-trees", Apr. 5, 2012.

Hwang, Y et al, "A fast Nearest Neighbor Search Algorithm by Nonlinear Embedding", Jun. 13, 2012.

International Search Report and Written Opinion of the International Searching Authority, dated Mar. 2, 2015, issued in related PCT Application No. PCT/US2014/047803.

Kushilevitz, E et al, "Efficient Search for Approximate Nearest Neighbot in High Dimensional Spaces", 1998.

"DBA Society"; May 22, 2015, 29 pages.

Alaggan, M.; "Private Peer-to-peer Similarity Computation in Personalized Collaborative Platforms"; dated: May 1-9, 2014; http://tel.archives-ouvertes.fr/docs/00/98/91/64/PDF/ALAGGAN_Mohammad.pdf.

Aschermann, Malte et al., "Similarity-Based Resource Retrieval in Multi-agent Systems by Using Locality-Sensitive Hash Functions," In: Mul t i agent System Technologies, pp. 4-18, 2013 See abstract; section 3; and figure 2.

Damgard, I. et al.; "On the Orthogonal Vector Problem and the Feasibility of Unconditionally Secure Leakage Resilient Computation"; dated: Apr. 23, 2014; https://eprint.iacr.org/2014/282.pd.

Huang, Y.;"Practical Secure Two-party Computation"; dated: Aug. 2012; http://yhuangpress.files.wordpress.com/2014/02/dissertation.pdf.

Jiang, Wei et al., "A Secure and Distributed Framework to Identify and Share Needed Information:," In: IEEE International Conference on Privacy, Security, Risk and Trust (PASSAT) and Social Computing (Soc i a l Com) pp. 1224-1230, Oct. 9-11, 2011 See abstract and section III.

Kraschewski, D.: "Complete Primitives for Information-theoretically Secure Two-party Computation"; dated: Jan. 25, 2013: https://www.google.co.in/url?sa=t&rct=j&q=&esrc=s&source=web&cd=1&ved=0CCIQFJAA&url=http%3A%2F%2Fdigbib.ubka.uni-karisruhe.de%2Fvoiltexte%2Fdocuments% 2F2613501&ei=52y6U5Dni.se0uATC-oHIDw&usg=AFQjCNHN4oC-wKUOFpnhZ9w3ASc5Dm2Gog&sig2=pz4XmiCGK5VVT4fdZjS7fQ&bvm=bv.70138588,d.c2E.

Liu, C. et al.;"Automating Efficient RAM-Model Secure Computation"; dated: Mar. 15, 2014:http://www.cs.umd.edu/~mwh/papers/ram-sc.pdf.

Nair, Divya G et al., "An Effective Private Data storage and Retrieval system using Secret sharing scheme based on Secure Multi-party Computation," In: International Conference on Data Science & Engineering (ICDSE), pp. 210-221, Aug. 26-28, 2014; See abstract; section III; and figures 1-2.

Oracle; "Flexible Data Streams"; 2005; Oracle Demand Planning Implementation and User's Guide; 16 pages.

PCT; "Notification of Transmittal of the International Search Report and the Written Opinion of the International Searching Authority, or the Declaration"; cited in PCT/US2014/053333; dated Apr. 29, 2015; 11 pages.

Preneel, B.; "Analysis and Design of Cryptographic Hash Functions"; dated: Feb. 2003: http://www.cosic.esat.kuleuven.be/publications/thesis-2.pdf.

Wiese, Lena, "Horizontal Fragmentation for Data Outsourcing with Formula-Based Confidentiality Constraints," In: Advances in Information and Computer Security, pp. 101-116. 2010 See abstract and section 4.

PCT International Search Report issued in PCT/US2015/059934; dated Jul. 28, 2016; 3 page.

Esmaeili et al., "A Fast Approximate Nearest Neighbor Search Algorithm in the Hamming Space," IEEE Transactions on Pattern Analysis and Machine Intelligence, vol. 34, Issue 12, Dec. 2012, pp. 2481-2488.

(56) References Cited

OTHER PUBLICATIONS

Ge et al., "Optimized Product Quantization for Approximate Nearest Neighbor Search," IEEE Conference on Computer Vision and Pattern Recognition (CVPR), Jun. 2013, pp. 2944-2951.
Wang et al., "Trinary-Projection Trees for Approximate Nearest Neighbor Search," IEEE Transactions on Pattern Analysis and Machine Intelligence, vol. 36, Issue 2, Feb. 2014, pp. 388-403.
Wei et al.,"Projected Residual Vector Quantization for ANN Search" IEEE MultiMedia, vol. 21, Jul.-Sep. 2014, pp. 41-51.

\* cited by examiner

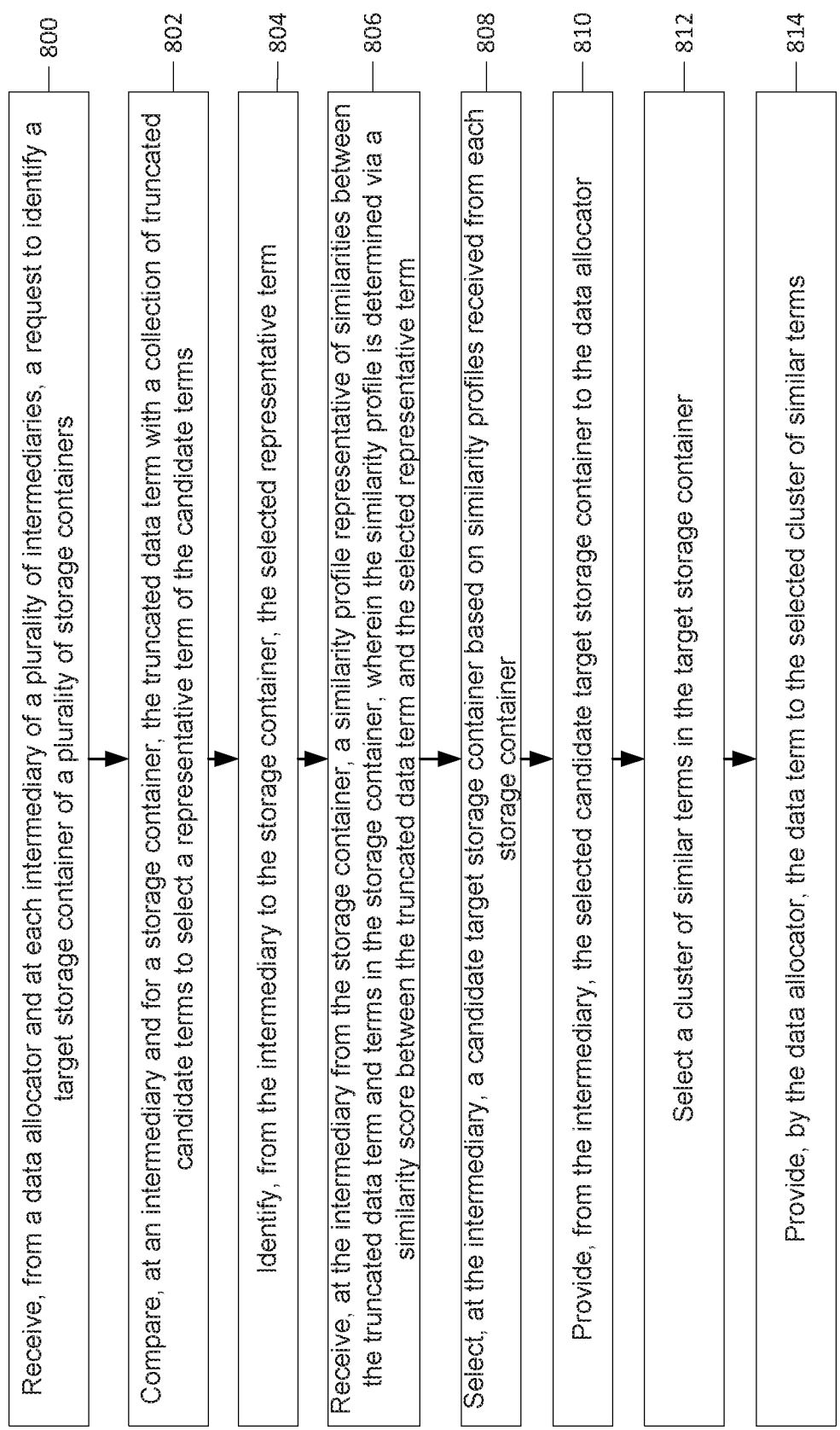

STORAGE ALLOCATION BASED ON SECURE DATA COMPARISONS VIA MULTIPLE INTERMEDIARIES

BACKGROUND

Data storage products, such as data backup devices, may be used to store data that are similar. Separate storage products may store distinct types of data, while a given storage container may store similar data. In some examples, such storage containers may be secured. In some examples, such storage containers may require data to be encrypted before being stored. In some examples, different storage containers may require different encryptions. Error in data storage may lead to inadvertent security loopholes and/or breaches.

BRIEF DESCRIPTION OF THE DRAWINGS

FIG. 8 is a flow diagram illustrating one example of a method for providing a data term to a target cluster in a target storage container.

DETAILED DESCRIPTION

Figure 1:
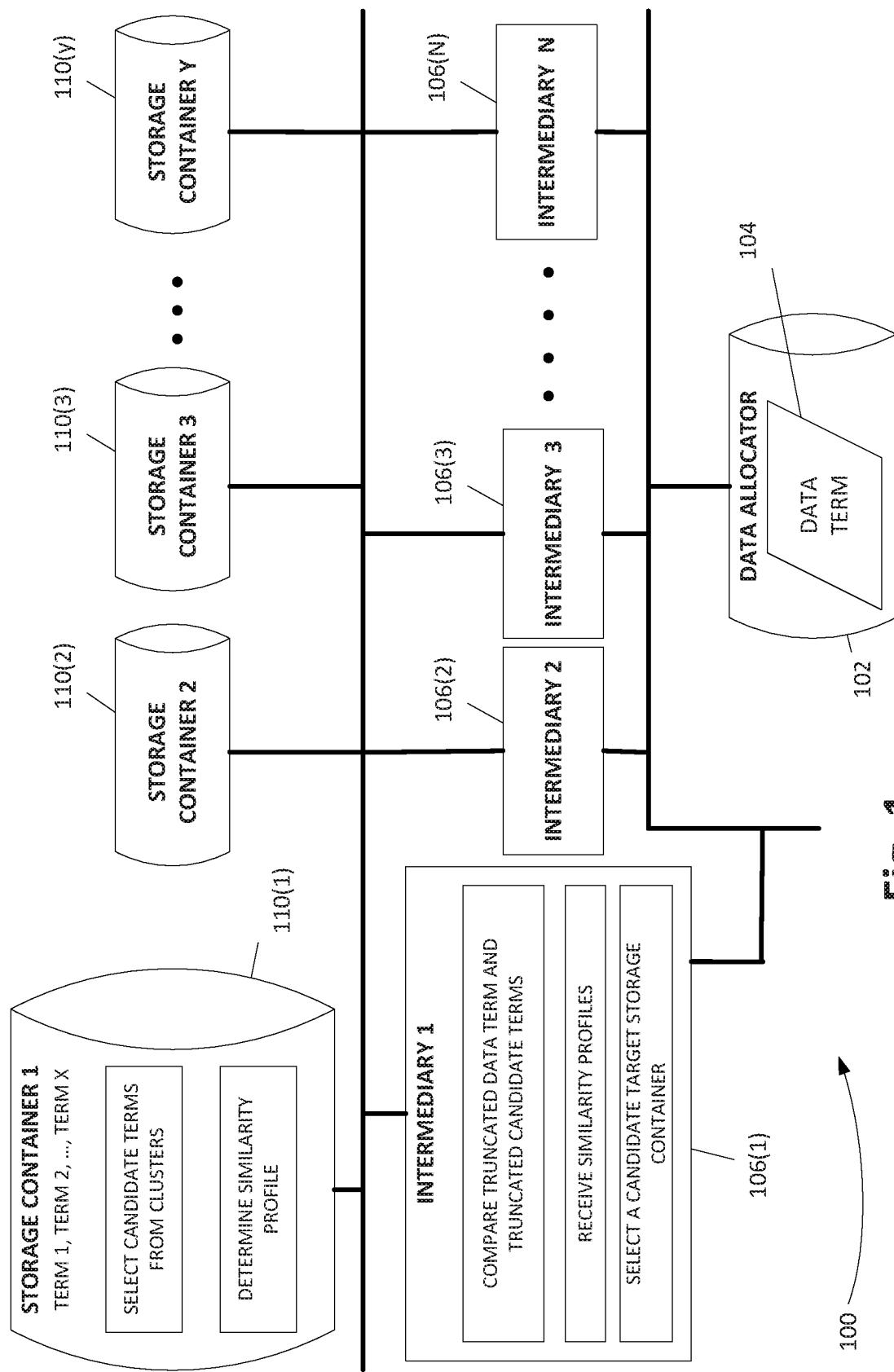
FIG. 1 is a functional block diagram illustrating one example of a system for storage allocation based on secure data comparisons.

Data storage products, especially data backup devices, are often used to store large amounts of similar data. In some instances, human error, or system error outside the backup device, may result in a data item being erroneously copied to a device other than the one for which it was intended. This may result in data loss, and/or accidental exposure of the data item to a third party, potentially with serious legal and/or commercial ramifications.

Data terms may be allocated to, or retrieved from, such storage containers. In some examples, the storage containers may be secured. In some examples, such storage containers may require data to be encrypted before being stored. In some examples, different storage containers may require different encryptions. Error in data storage may lead to inadvertent security loopholes and/or breaches.

In some instances, a first party may desire to securely store information in a plurality of storage containers. Based on a volume of data, such situations may result in an increase in a number of secure computations and inter-party data exchanges. Also, for example, there may be intermediate intermediaries that may not be secure, and/or may have unreliable data protection mechanisms. In such instances, there is a need to not expose all the data from one or more of the parties. Accordingly, there is a need to compute similarity between data distributed over multiple parties, without exposing all the data from any party, and without a need for intermediaries.

Existing systems are generally directed to addressing the need for identifying storage containers with content similar to an incoming data element. However, such systems focus on identifying similarities with the data content after the data element has been stored in a storage container. Accordingly, there is a need to identify an appropriate data storage container prior to storing the incoming data element, while maintaining the anonymity of the data stored in the storage containers and the incoming data element. An array of intermediary nodes may be utilized to securely associate incoming data with at least one storage container of a plurality of storage containers, while maintaining anonymity of the incoming data and the plurality of storage containers As described in various examples herein, storage allocation based on secure data comparisons is disclosed. Storage allocation based on secure data comparisons is a secure protocol that allows one party to select an appropriate storage container of a plurality of storage containers without revealing the data that supports the information. One example is a system including a plurality of intermediaries, a data allocator and a plurality of storage containers. Each intermediary receives a request from the data allocator to identify a target storage container of the plurality of storage containers, for secure allocation of a data term. Each intermediary compares, for each storage container, the truncated data term with a collection of truncated candidate terms to select a representative term of the candidate terms, identifies the selected representative term to the storage container, receives a similarity profile from each storage container, where the similarity profile is representative of similarities between the truncated data term and terms in the storage container, and selects a candidate target storage container based on similarity profiles received from each storage container.

Data comparisons may be performed in a variety of ways. For example, dense real-valued vectors may be used to represent the data terms. In some examples, as described herein, sparse binary vectors may be utilized to achieve better comparison efficiency.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for system for storage allocation based on secure data comparisons. System 100 is shown to include a plurality of intermediaries 106 (e.g., Intermediary 1 106(1), Intermediary 2 106(2), . . . , Intermediary N 106(N), connected to a data allocator 102 and a plurality of storage containers 110 (e.g., Storage container 1 110(1), Storage container 2 110(2), . . . , Storage container Y 110(y)), that may sometimes be referred to as, $B_1$, $B_2$, . . . , $B_y$. The data allocator 102, the plurality of intermediaries 106, and the plurality of storage containers 110 may be communicatively linked to one another via a network.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network. In some examples, the network may be a secured network.

In some examples, the storage containers $B_1, B_2, \ldots, B_y$, may include collections of data terms that may be represented as d-dimensional real-valued vectors. The data allocator 102 may want to move/copy a data term 104 to one of the plurality of storage containers 110. The goal of the secure storage container allocation process described herein is to minimize information leakage while transferring the data term 104 from the data allocator to a target storage container, where the target storage container has a subset of data terms that have high similarity to the data term 104. Generally, the storage containers $B_1, B_2, \ldots, B_y$, may not want to share their information with other parties in the system 100.

To facilitate the secure storage container allocation process between all parties, a plurality of intermediaries 106 may be utilized. For the purposes of this description, each of the plurality of intermediaries 106 may be assumed to be a semi-honest node, i.e., the intermediary follows the protocol as described herein; however, in some instances, it may utilize the messages that it receives to extract more information about data terms. The data allocator 102 sends a request to each of the plurality of intermediaries 106 to initiate the allocation process.

The request includes two parameters, a hash universe size U, and a sparsity number H indicative of a number of one's in a sparse binary vector representation of a data term 104. The integer H may be experimentally determined based on the type and number of data terms that may need to be stored. Generally, U is a very large integer relative to H. In one example, U is a power of 2. The plurality of intermediaries 106 receive, from the data allocator 102, the request for identification of a target storage container of the plurality of storage containers 110 to be associated with the data term 104. In some examples, the data term 104 may be an N-dimensional vector with numerical, real-valued components. The term "identification" as used herein, generally refers to identifying a target storage container that may be a suitable destination for the data term 104. For example, identification may mean identifying a storage container that includes terms that are most similar to the data term 104. The term "similar" may be used broadly to include any type of similarity for data terms.

For purposes of this discussion, we may consider the data term 104 to be a feature vector. A feature vector may refer to any vector or set of values in feature space that represents an object. Feature vectors may represent data objects, and used across any number of applications. For example, a set of feature vectors may specify characteristics data for video streaming data, digital images, internet or network traffic, organization or corporation data, gene sequences, human facial features, speech data, and countless other types of data. Feature vectors may be used to support machine-learning, classification, statistical analysis, and various other applications. In many instances, similar feature vectors may need to be sorted and stored together for efficient search and retrieval.

Various processing applications may use feature vectors, and such applications may transform or manipulate the feature vectors in different ways for analysis, machine-learning, classifier training, or other specific uses. The dimensionality of a vector may specify a number of dimensions that a vector has. In that regard, a particular vector may have a number of vector elements (or, phrased another way, a vector length) equal to the dimensionality of the vector.

As described herein, in some examples, system 100 may be provided with values for sparsity number H and hash universe size U. In some examples, each 6000-dimensional vector (N=6000) may be associated with 100 one's (H=100) selected from the set $\{1, 2, 3, \ldots, 2^{18}\}$ ($U=2^{18}$). Accordingly, the hash transform may transform a higher dimensional data term (e.g. with 6000 dimensions) into a lower dimensional transformed data term (e.g. with 100 dimensions). Each of the plurality of intermediaries 106 generates a random permutation based on the hash universe size U, and sends the permutation to the data allocator 102 and the plurality of storage containers (e.g., Storage container 1 110(1), Storage container 2 110(2), . . . , Storage container Y 110(y)). Each of the plurality of storage containers 110 also receives the sparsity number H.

The data allocator 102 and the plurality of storage containers (e.g., Storage container 1 110(1), Storage container 2 110(2), . . . , Storage container Y 110(y)) respectively apply a predetermined orthogonal transform to the data term 104 and to a plurality of data terms in the respective storage containers, to generate sparse binary vectors indicating top hashes. For example, the transformation of the data term 104 and the plurality of terms may be based on the sparsity number H. In some examples, the hash transform may be an orthogonal transformation. Since the random permutation is associated with a particular intermediary, and there are N intermediaries, application of the hash transform to each data term results in a generation of N sparse binary vectors associated with each data term, one for each intermediary.

As used herein, a sparse binary vector has binary component values (by including only '1' and '0' values) and is sparse (having a number of '1' values significantly less than the vector dimensionality, e.g., less than a predetermined sparsity threshold or percentage). The term "orthogonal transformation" as used herein generally refers to a linear transformation between two linear spaces that preserves their respective linear structure (e.g., preserves an inner product).

In some examples, the plurality of storage containers (e.g., Storage container 1 110(1), Storage container 2 110(2), . . . , Storage container Y 110(y)) generate clusters of a plurality of terms in each storage container, the clusters being based on similarity scores for pairs of terms in the storage container. The storage container selects a candidate term from each cluster, where the candidate term is representative of the cluster. For example, Storage container 1 110(1) may include a plurality of terms (e.g., term 1, term 2, . . . , term X), and may generate clusters of the plurality of terms. A similarity score between two data terms may be determined based on a number of common ones in their respective sparse binary vector representations. For example, the similarity score between two vectors with the same length may be defined as a ratio of a number of shared one's to the vector's length, which is denoted by $\zeta$. This provides an approximate measure of similar data terms, and is indicative of proximity of a pair of data terms.

In some examples, a similarity map $\Omega_B$ (not shown in FIG. 1) may be determined for a storage container B (e.g., Storage container 1 110(1)). Let $\zeta_{i,j}$ denote a similarity score between two terms $b_i$ and $b_j$ of storage container B, where $1 \leq i, j \leq X$. Then, the similarity scores between all pairs of terms of B may be denoted by a matrix $\Omega_B = (\zeta_{i,j})_{1 \leq i, j \leq X}$.

A storage container may be partitioned into, say G clusters by grouping similar data terms together, where similar data terms are based on similarity scores. In some examples, a partitioning around k-medoids ("PAM") algorithm may be utilized to obtain G candidate terms from the G clusters, the candidate terms denoted as $r_1, r_2, \ldots, r_G$, where $1 \leq G \leq X$, where X is the total number of terms in Storage container 1 110(1). Upon selection of the candidate terms, the storage container 1 110(1) applies a hash transform to generate N sparse binary vectors associated with each candidate term, one for each intermediary.

In some examples, the sparse binary vector representing a data term may be further truncated to generate a truncated term. For example, portions of the sparse binary vector may be removed to generate a vector of smaller length. In some examples, the removed portion may be associated with a specific intermediary, and different intermediaries may be associated with distinct removed portions. Such a modification to the vector results in partial information being transferred to each intermediary, making it difficult for each intermediary to identify all aspects of a given term.

For simplicity, and for purposes of teaching how a truncated term may be generated, it may be assumed that a sparse vector has length M*N which is an integer multiple of N, where N is the number of intermediaries 106. If a sparse binary vector is denoted as a, then the vector a may be partitioned into N sub-vectors with each sub-vector having length M*N/N=M. Accordingly, the vector a may be represented with N components as follows:

$$a = (a_1, a_2, \ldots, a_N) \quad \text{(Eqn. 1)}.$$

For each intermediary i, $1 \leq i \leq N$, information may be extracted from (N−1) sub-vectors and one sub-vector may be deleted from vector a. For example, for Intermediary 1 106(1), the first component of vector a may be deleted to provide a truncated vector $\tilde{a}_1$, respectively, where:

$$\tilde{a}_1 = (a_2, \ldots, a_N) \quad \text{(Eqn. 2)}$$

Likewise, for Intermediary 2 106(2), the second component of vector a may be deleted to provide truncated vector $\tilde{a}_2$ respectively, where:

$$\tilde{a}_2 = (a_1, a_3, \ldots, a_N) \quad \text{(Eqn. 3)}$$

and so forth for each intermediary of the plurality of intermediaries 106. Note that one different sub-vector may be left out for each intermediary; accordingly, each sub-vector may be left out once and only once. Based on such extraction, N truncated terms may be generated for each term, one for each intermediary of the plurality of intermediaries 106. Likewise, each of the X sparse binary vectors in storage container 1 110(1) (corresponding to the X terms) may generate X*N plurality of truncated terms, one for each intermediary.

Each of the plurality of intermediaries 106 receive, from the data allocator 102, a respective truncated version of the data term 104, where the truncated version is based on the sparsity number and the permutation, as described herein. For example, a truncated data term 1 such as $\tilde{a}_1$ may be provided to Intermediary 1 106(1). Intermediary 2 106(2) may receive a truncated data term 2 which comprises a sub-vector of a with the second component removed, and so forth. Likewise, each of the plurality of intermediaries 106 receive, from each of the plurality of storage containers (e.g., Storage container 1 110(1), Storage container 2 110(2), ..., Storage container Y 110(y)), truncated versions of a collection of candidate terms, where each candidate term represents a cluster of similar terms in the associated storage container, and where the truncated versions are based on the sparsity number and the permutation. Accordingly, Intermediary 1 106(1) receives truncated data term 1, and a plurality of truncated candidate terms with the respective first components removed; Intermediary 2 106(2) receives truncated data term 2, and a plurality of truncated candidate terms with the respective second components removed; and Intermediary N 106(N) receives truncated data term N, and a plurality of truncated candidate terms with the respective N-th component removed.

As described herein, the intermediary 106 determines similarity scores between the truncated version of the data term 104 and the truncated versions of the candidate terms, where the similarity score is indicative of proximity of the truncated versions of the candidate terms to the truncated version of the data term 104, and based on shared data elements between the truncated version of the data term 104 and the truncated versions of the candidate terms. In some examples, the truncated version of the data term 104 and each truncated candidate term may be of same length, and the similarity score may be a ratio of a number of shared data elements between the truncated version of the data term 104 and a truncated candidate term of that length.

Each intermediary compares, for each storage container, the respective truncated data term with the respective truncated candidate terms to select a representative term of the candidate terms, where the truncated candidate terms are truncated versions of candidate terms representative of each cluster of similar terms in the storage container. For example, the intermediary 1 106(1) may compute the similarity score between the truncated version of the data term 104 and the truncated versions of the candidate terms received from all the storage containers. The intermediary 1 106(1) may then determine, for each storage container, the top candidate term defined as the candidate term with the highest similarity to the data term 104, and select this top candidate term as the representative term for the storage container. In some examples, more than one representative term may be selected for a storage container. Thereafter, each intermediary identifies the selected representative term to each storage container, and provides the similarity score between the representative term and the truncated data term.

In some examples, each storage container may approximate the similarity between the truncated version of the data term 104 and the data terms from the cluster represented by the selected representative term determined by each intermediary. Accordingly, a given intermediary, for example, Intermediary 1 106(1), is not privy to the actual composition of the data term 104 in the data allocator 102, and the plurality of terms in a given storage container, e.g., Storage container 1 110(1). Also, for example, the data allocator 102 has no knowledge of the actual composition of the plurality of terms in a given storage container, e.g., Storage container 1 110(1). Likewise, the given storage container, e.g., Storage container 1 110(1), has no knowledge of the actual composition of the data term 104 in the data allocator 102.

Each storage container, in turn, utilizes the techniques disclosed herein, to determine similarity scores between the truncated data term and the plurality of terms in the storage container, based on the similarity scores between the truncated data term and the representative terms received from the intermediary.

As described herein, the similarity score denoted by $\zeta$ between two vectors with the same length may be defined as a ratio of a number of common one's to the vectors' length L. Let M denote the common number of elements between two vectors, L the length of vectors, $\zeta_{a,w}$ and $\zeta_{b,w}$ denote the similarity scores between a and w, and b and w, respectively. Then the overlap may be determined as $|a \cap w|=M_{a,w}=L \cdot \zeta_{a,w}$ and $|b \cap w|=M_{b,w}=L \cdot \zeta_{b,w}$. A similarity distribution for $\zeta_{a,b}$ may then be derived as $M_{a,b}=L \cdot \zeta_{a,b}$. To derive the similarity distribution $M_{a,b}$, the overlap of terms a and b may be analyzed. For simplicity of notation, let $q_1=\{(a \cap b) \cap (a \cap w)\}$, and $q_2=\{(a \cap b) \cap (a \backslash w)\}$ denote two disjoint component sets for $a \cap b$. Then, $M_{a,b}=a \cap b=|q_1|+|q_2|$. In some examples, the similarity distribution $M_{a,b}$ may have a hypergeometric distribution. In some examples, the distribution of $M_{a,b}=a \cap b=|q_1|+|q_2|$ may be determined based on known and independent distributions of $|q_1|$ and $|q_2|$.

In some examples, once the representative terms denoted as $r_1, r_2, \ldots, r_G$, where $1 \leq G \leq X$ are determined by each intermediary, the similarity scores $\zeta_{a,r_1}, \zeta_{a,r_2}, \ldots, \zeta_{a,r_G}$ between the truncated data term a and the G representative terms may be determined at the intermediary, and provided to a respective storage container. In some examples, a preferred term b* may be selected as a term most similar to the truncated data term a. For example, the preferred term b* may be selected as:

$$b^*=\mathrm{argmax}_i \zeta_{a,r_i}, 1 \leq i \leq G \qquad \text{(Eqn. 4)}$$

More formally, a similarity distribution of the similarity scores between two terms a and b, given their similarity to a third term w, may be derived. For example, a may be the truncated data term, b may be a term of the plurality of terms $b_1, b_2, \ldots, b_x$, in the storage container 1 110(1), and w may be the representative term for a cluster identified by intermediary 1 106(1). For example, for each $1 \leq j \leq X$, given the two similarity scores $\zeta_{a,b^*}$ and $\zeta_{b^*,b_j}$, the similarity distribution for $\zeta_{a,b_j}$ may be determined, as described herein.

Each storage container then computes a similarity profile of all the similarity scores between the data term 104 and the terms in the storage container. In some examples, the similarity profile may only be determined for the similarity scores between the data term 104 and the terms in the cluster represented by a representative term. The term "similarity profile" as used herein may be any statistical representation that captures a summary of the data (e.g., similarity scores, similarity distributions). In some examples, the similarity profile may be one of a mean, median, or mode of the approximated similarity scores. In some examples, each storage container provides the similarity profile to each intermediary. Each intermediary identifies a candidate target storage container based on the similarity profile. For example, the intermediary 1 106(1) may identify a storage container with the highest similarity profile.

Generally, the storage container determines the similarity profile between the truncated version of the data term 104 and the truncated terms in the cluster associated with the representative term without knowledge of the data term 104, where the determination is based on the similarity scores (determined at the intermediaries 106) between the truncated version of the data term 104 and the truncated version of the representative term. The main idea behind determining the similarity profile is to estimate the similarity between the truncated version of the data term 104 and all truncated terms in the cluster associated with the representative term, by only knowing the similarity score between the truncated version of the data term 104 and the truncated version of the representative term identified by storage container 1 110(1).

Accordingly, in the secure information retrieval described herein, the storage containers each share a truncated version of the representative term with the intermediary 106, and the data allocator 102 only shares a truncated version of the data term 104 with the intermediary 106. Accordingly, the intermediary 106 is not privy to the actual composition of the data term 104 in the data allocator 102, and the plurality of terms in the storage container associated with a storage container, say Storage container 1 110(1). Also, for example, the data allocator 102 has no knowledge of the actual composition of the plurality of terms in the storage container associated with a storage container, say Storage container 1 110(1). Likewise, the storage container associated with a storage container, say Storage container 1 110(1), has no knowledge of the actual composition of the data term 104 in the data allocator 102. The intermediaries 106 compute similarity scores between the truncated version of the data term 104 and the truncated versions of the representative terms, and provide the determined similarity scores to the storage containers. The storage containers, in turn, utilize the comparative distribution techniques disclosed herein, to determine similarity scores between the truncated version of the data term 104 and the plurality of truncated versions of terms based on the similarity scores between the truncated version of the data term 104 and the truncated versions of the representative terms received from the respective intermediaries.

Each intermediary receives a similarity profile for each of the storage containers, and selects a candidate target storage container based on similarity profiles received from each storage container. The candidate target storage container is provided to the data allocator 102. As described herein, each intermediary is unaware of the actual data term, or candidate target storage containers selected by other intermediaries.

The data allocator 102 may identify the target storage container from the candidate target storage containers received from the plurality of intermediaries 106. The data term 104 may be provided to the identified target storage container.

As described herein, another advantage of such indirect determination of similarity scores is that if the data allocator 102 requests an additional target storage container for a second data term, the same truncated versions of the representative terms may be utilized again to select the additional target storage container. Also, for example, the data allocator 102 may determine that the second data term is similar to the data term, and provide the second data term to the identified target storage container.

In some examples, each intermediary may select a target cluster of the identified target storage container based on the determined similarity profile, and may associate the data term 104 with the target cluster in the target storage container. For example, the target cluster may be the cluster associated with the representative term. In some examples, the target storage container may be a secure storage container, and the intermediary may associate the data term 104 with a cluster in the secure storage container. In some examples, the secure storage container selected as the target storage container may comprise partitions for data storage, and the intermediary may associate the data term 104 with a partition of the secure storage container.

In some examples, each intermediary may rank the plurality of storage containers based on the determined similarity scores, and/or the similarity profile. For example, the representative terms may be ranked based on respective similarity scores with the truncated data term. Accordingly, the associated storage containers may be ranked based on the ranking for the representative terms. In some examples, the similarity profile may be utilized to rank the plurality of storage containers, and each intermediary may provide a list of top-k candidate target storage containers to the data allocator 102. The data allocator 102 may then select the target storage container from the ranked list of candidate target storage containers. In some examples, the intermediary 106 may rank the clusters in a given storage container, and may provide the ranked clusters to the data allocator 102.

For example, a cluster of similar terms in the target storage container may be selected by the data allocator 102 and/or the intermediaries. In some examples, the target storage container identified by the data allocator 102 may be partitioned into clusters of similar terms and the data term 104 may be allocated to a cluster with terms that are most similar to the data term 104. In some examples, the data allocator may first identify the target storage container, and then identify the cluster of similar terms based on the similarity profile of the target storage container. In some examples, each intermediary may select a candidate cluster of similar terms in the candidate target storage container identified by the intermediary, and provide the candidate cluster of similar terms to the data allocator 102, along with a similarity profile of the candidate target storage container. The data allocator 102 may then select the cluster of similar terms from the candidate clusters of similar terms received from each intermediary.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated visualization function.

For example, each intermediary 106 may be a combination of hardware and programming for performing a designated function. For example, intermediary 1 106(1) may include programming to receive, from the data allocator 102, a request to identify a target storage container of the plurality of storage containers 110, the request including a truncated version of a data term to be securely allocated to the target storage container. The intermediaries 106 may include hardware to physically store the similarity scores, and processors to physically process the received terms, determined similarity scores, and received similarity profiles. Also, for example, intermediaries 106 may include software programming to dynamically interact with the other components of system 100.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, the data allocator 102 and the plurality of storage containers (e.g., Storage container 1 110(1), Storage container 2 110(2), ..., Storage container Y 110(y)) may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
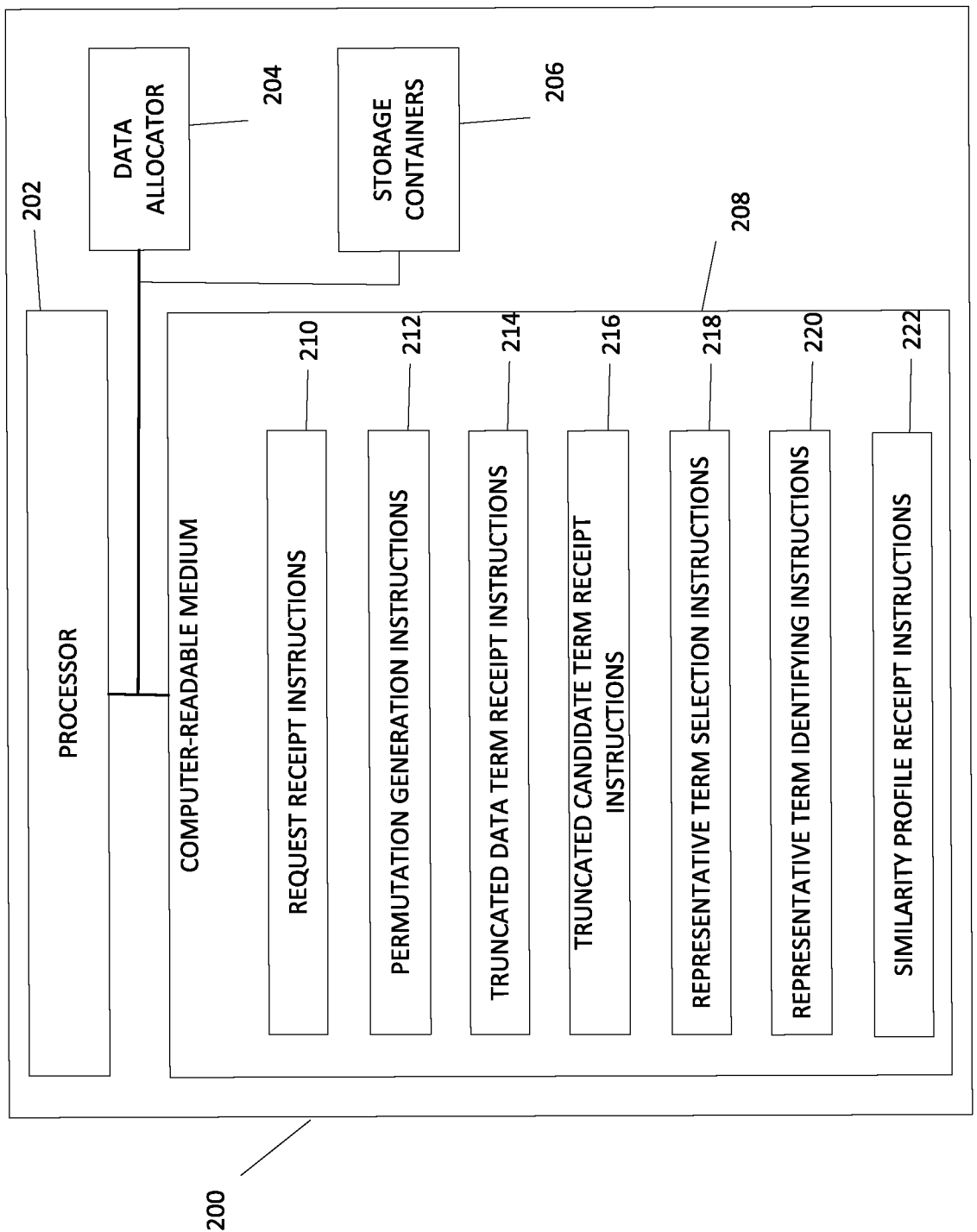
FIG. 2 is a block diagram illustrating one example of a computer readable medium for storage allocation based on secure data comparisons.

FIG. 2 is a block diagram illustrating one example of a computer readable medium for storage allocation based on secure data comparisons. Processing system 200 includes a processor 202, a computer readable medium 208, data allocator 204, and storage containers 206. Processor 202, computer readable medium 208, data allocator 204, and storage containers 206 are coupled to each other through a communication link (e.g., a bus).

Processor 202 executes instructions included in the computer readable medium 208. Computer readable medium 208 includes request receipt instructions 210 to receive, from data allocator 204 and at each intermediary of a plurality of intermediaries, a request for identification of a target storage container of a plurality of storage containers 206 to be associated with a data term, the request including a hash universe size and a sparsity number.

Computer readable medium 208 includes permutation generation instructions 212 to generate a random permutation based on the hash universe size.

Computer readable medium 208 includes truncated data term receipt instructions 214 to receive, from the data allocator 204, a truncated version of the data term, the truncated data term is based on the sparsity number and the permutation.

Computer readable medium 208 includes truncated candidate term receipt instructions 216 to receive, from a storage container 206, truncated versions of a collection of candidate terms, where each candidate term represents a cluster of similar terms in the storage container 206, and where the truncated candidate terms are based on the sparsity number and the permutation.

Computer readable medium 208 includes representative term selection instructions 218 to compare, for the storage container 206, the truncated data term with the truncated candidate terms to select a representative term of the candidate terms.

Computer readable medium 208 includes representative term identifying instructions 220 to identify the selected representative term to the storage container 206. Instructions 220 include instructions to provide a similarity score between the truncated data term and the selected representative term.

Computer readable medium 208 includes similarity profile receipt instructions 222 to receive, from the storage container 206, a similarity profile representative of similarities between the truncated data term and terms in the storage container 206, where the similarity profile is determined via the similarity score between the truncated data term and the selected representative term.

In some examples, computer readable medium 208 includes instructions to select a candidate target storage container at each intermediary based on similarity profiles received from each storage container 206, and provide, without knowledge of the data term or candidate target storage containers 206 selected by other intermediaries, the selected candidate target storage container to the data allocator 204.

In some examples, computer readable medium 208 includes instructions to identify, at the data allocator 204, the target storage container from the candidate target storage containers 206, and provide the data term to the identified target storage container.

In some examples, computer readable medium 208 includes instructions to identify, at each intermediary, a candidate cluster of similar terms from the candidate target storage container identified by each intermediary, and provide, without knowledge of the data term or candidate clusters of similar terms identified by other intermediaries, the identified candidate cluster of similar terms to the data allocator.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage containers.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include Processor 202 for executing those instructions. Thus, computer readable medium 208 may store program instructions that, when executed by Processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
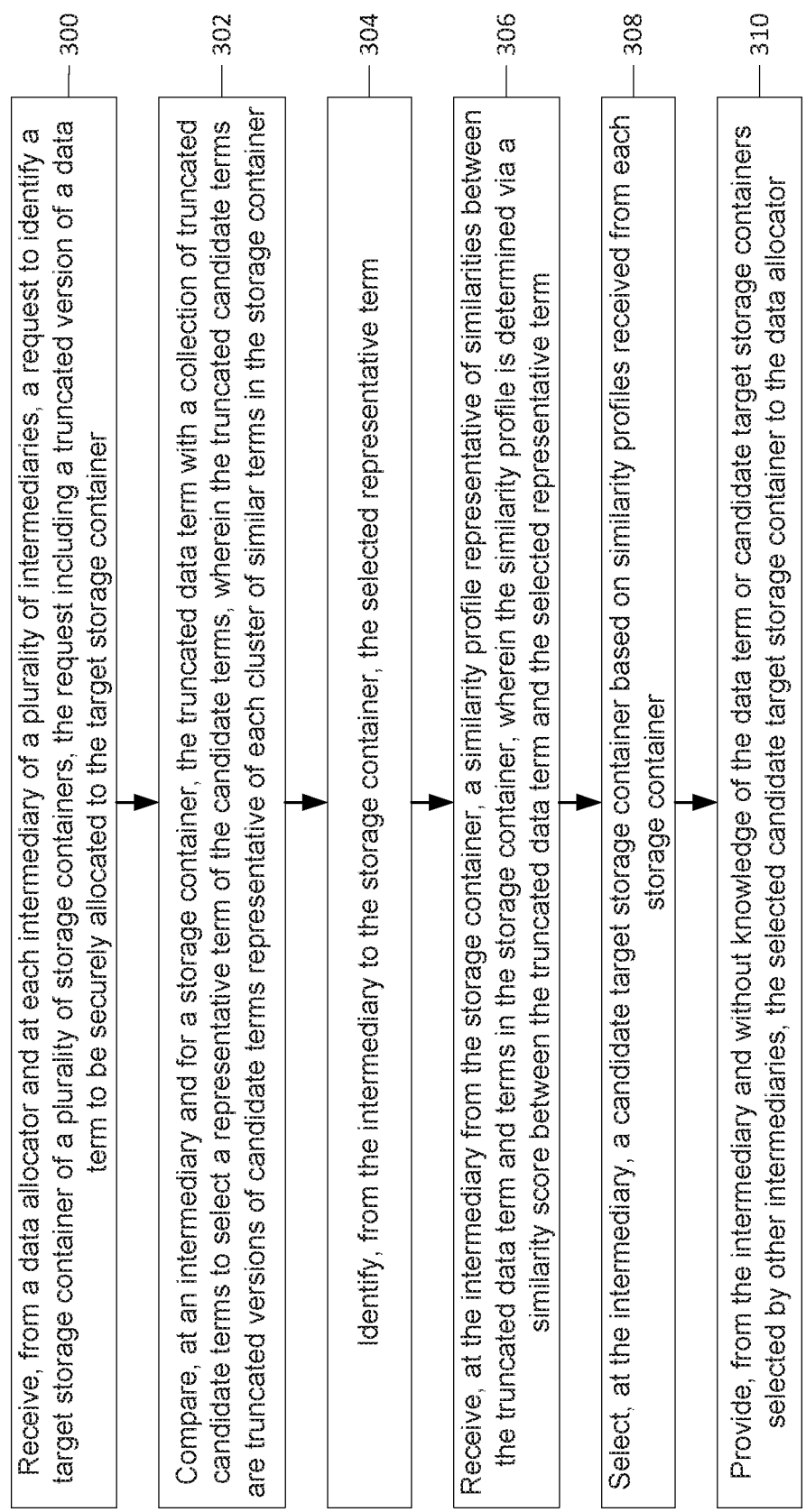
FIG. 3 is a flow diagram illustrating one example of a method for identifying candidate target storage containers.

FIG. 3 is a flow diagram illustrating one example of a method for identifying candidate target storage containers.

At 300, each intermediary of a plurality of intermediaries may receive, from a data allocator, a request to identify a target storage container of a plurality of storage containers. The request may include a truncated version of a data term to be securely allocated to the target storage container.

At 302, the truncated data term may be compared, at an intermediary and for a storage container, with a collection of truncated candidate terms to select a representative term of the candidate terms. Generally, the truncated candidate terms may be truncated versions of candidate terms representative of each cluster of similar terms in the storage container.

At 304, the selected representative term may be identified from the intermediary to the storage container, along with a similarity score between the truncated data term and the selected representative term.

At 306, a similarity profile representative of similarities between the truncated data term and terms in the storage container may be received at the intermediary from the storage container, where the similarity profile is determined via the similarity score between the truncated data term and the selected representative term.

At 308, a candidate target storage container may be selected at the intermediary, based on similarity profiles received from each storage container.

At 310, the selected candidate target storage container may be provided to the data allocator, from the intermediary and without knowledge of the data term or candidate target storage containers determined by other intermediaries.

Figure 4:
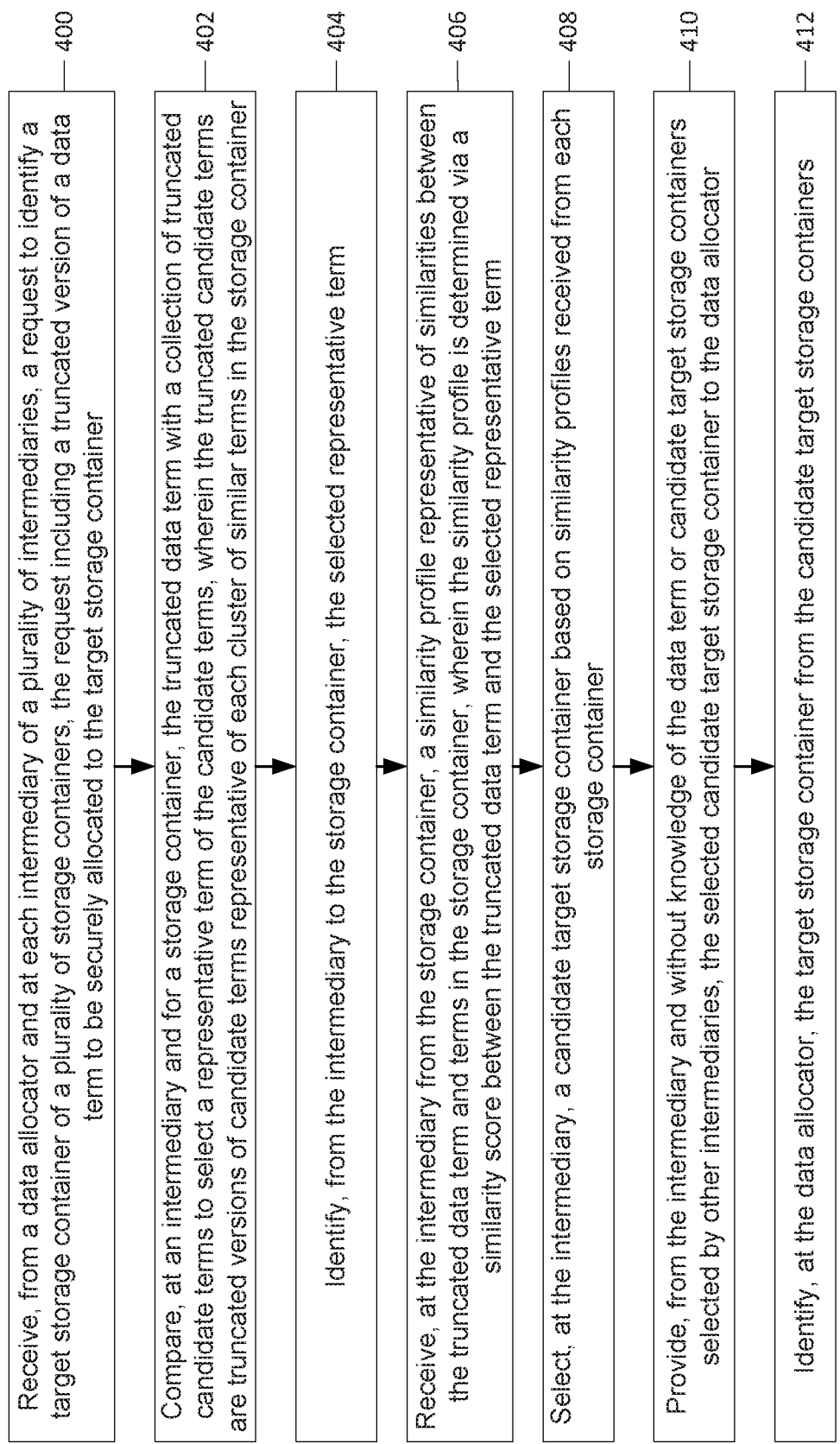
FIG. 4 is a flow diagram illustrating one example of a method for identifying a target storage container.

FIG. 4 is a flow diagram illustrating one example of a method for identifying a target storage container. Some aspects of the example method illustrated in FIG. 4 may be similar to aspects of the example method illustrated in FIG. 3. For example, blocks 400-410 of FIG. 4 may perform operations similar to those performed respectively by blocks 300-310 of FIG. 3.

At 412, the target storage container may be identified by the data allocator from the candidate target storage containers. For example, the data allocator may receive a first candidate target storage container selected by a first intermediary, a second candidate target storage container selected by a second intermediary, and so forth. In some examples, the data allocator may receive a similarity profile associated with each of these selected candidate target storage containers, and may identify the target storage container based on these similarity profiles. For example, the identified target storage container may be the one that has a similarity profile that indicates optimal matching with the data term.

Figure 5:
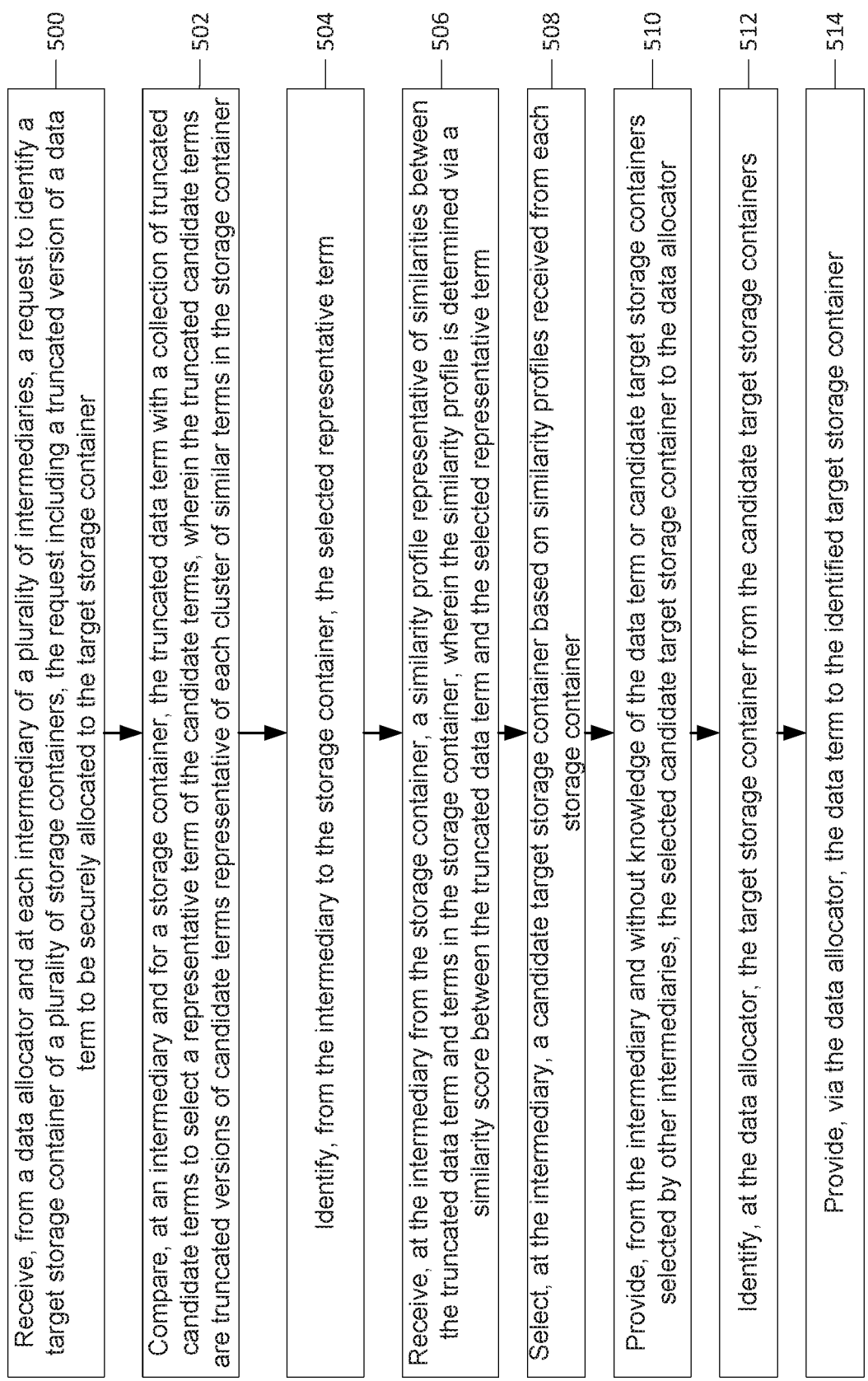
FIG. 5 is a flow diagram illustrating one example of a method for providing a data term to a target storage container.

FIG. 5 is a flow diagram illustrating one example of a method for providing a data term to a target storage container. Some aspects of the example method illustrated in FIG. 5 may be similar to aspects of the example method illustrated in FIG. 4. For example, blocks 500-512 of FIG. 5 may perform operations similar to those performed respectively by blocks 400-412 of FIG. 4.

At 514, the data term may be provided to the identified target storage container.

Figure 6:
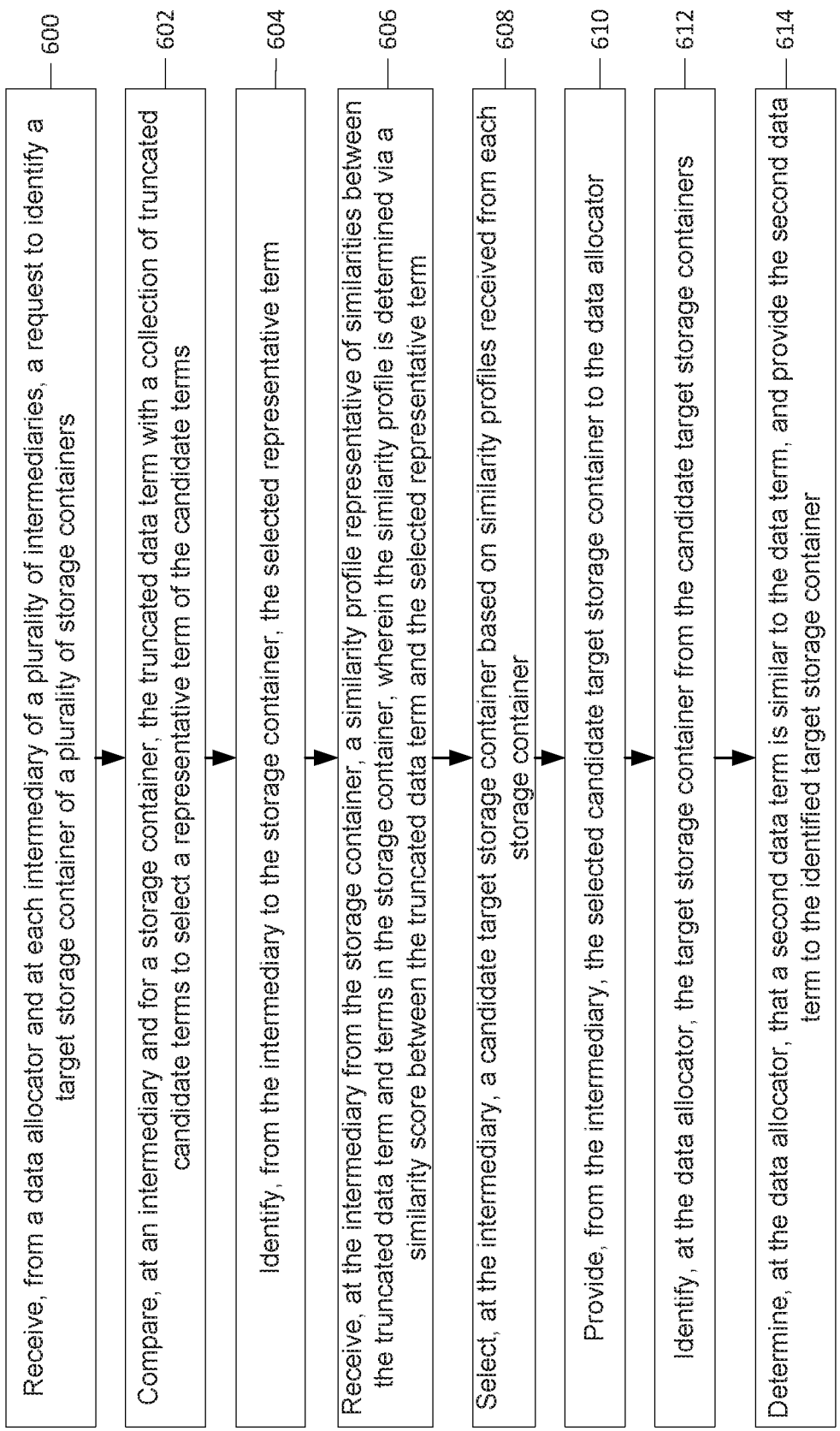
FIG. 6 is a flow diagram illustrating one example of a method for providing similar data terms to a target storage container.

FIG. 6 is a flow diagram illustrating one example of a method for providing similar data terms to a target storage container. Some aspects of the example method illustrated in FIG. 6 may be similar to aspects of the example method illustrated in FIG. 4. For example, blocks 600-612 of FIG.

6 may perform operations similar to those performed respectively by blocks 400-412 of FIG. 4.

At 614, the data allocator may determine that a second data term is similar to the data term, and provide the second data term to the identified target storage container associated with the data term.

Figure 7:
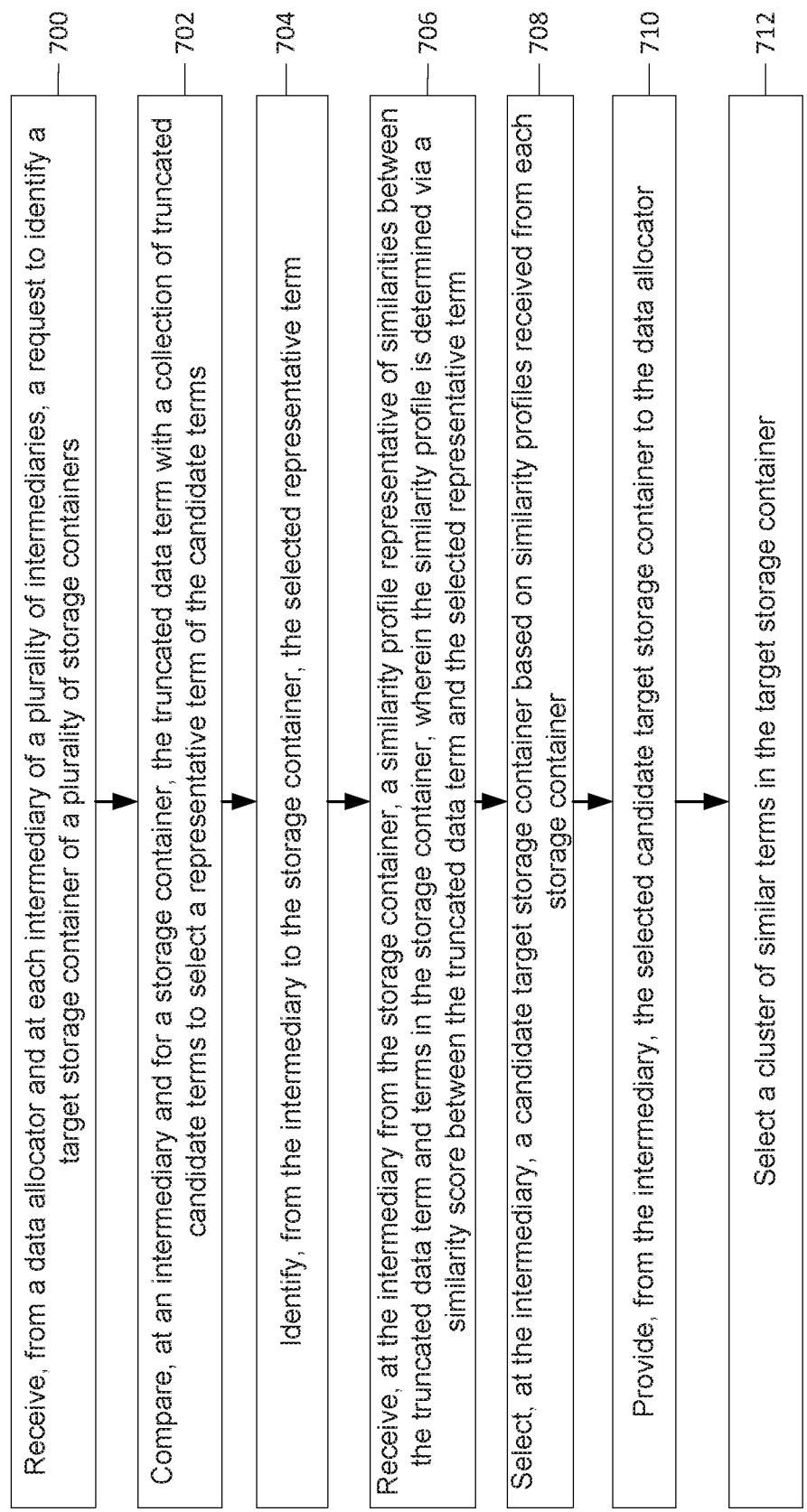
FIG. 7 is a flow diagram illustrating one example of a method for selecting candidate clusters of similar terms in an identified target storage container.

FIG. 7 is a flow diagram illustrating one example of a method for selecting candidate clusters of similar terms in an identified target storage container. Some aspects of the example method illustrated in FIG. 7 may be similar to aspects of the example method illustrated in FIG. 3. For example, blocks 700-710 of FIG. 7 may perform operations similar to those performed respectively by blocks 300-310 of FIG. 3.

At 712, a cluster of similar terms may be selected in the target storage container. In some examples, the target storage container may be partitioned into clusters of similar terms and the data term may be allocated to a cluster with terms that are most similar to the data term. In some examples, the data allocator may first identify the target storage container, and then identify the cluster of similar terms based on the similarity profile of the target storage container. In some examples, each intermediary may select a candidate cluster of similar terms in the candidate target storage container identified by the intermediary, and provide the candidate cluster of similar terms to the data allocator, along with a similarity profile of the candidate target storage container. The data allocator may then select the cluster of similar terms from the candidate clusters of similar terms received from each intermediary.

FIG. 8 is a flow diagram illustrating one example of a method for providing a data term to a target cluster in a target storage container. Some aspects of the example method illustrated in FIG. 8 may be similar to aspects of the example method illustrated in FIG. 7. For example, blocks 800-812 of FIG. 8 may perform operations similar to those performed respectively by blocks 700-712 of FIG. 7.

At 814, the data allocator may provide the data term to the selected cluster of similar terms. In some examples, the data allocator may determine that a second data term is similar to the data term, and provide the second data term to the selected cluster of similar terms associated with the data term.

Examples of the disclosure provide a generalized system for storage allocation based on secure data comparisons. The generalized system provides a protocol for identifying storage containers with content similar to an incoming data element in a secure and anonymized manner. The present disclosure focusses on identifying an appropriate data storage container prior to storing the incoming data element, while maintaining the anonymity of the data stored in the storage containers and the incoming data element.

Although the examples are described with a data term in a query storage container, the techniques disclosed herein may be applied to more than one data term in the query storage container. Generation of secure terms based on the transformed data terms ensures that the intermediary does not have complete data; so information may not be leaked by the intermediary. Additionally, the hash transformation ensures that the intermediary only has the hashes. Accordingly, the intermediary is unable to regenerate the original data terms in the storage containers (i.e., hash-to-data is not possible).

Although specific examples have been illustrated and described herein, especially as related to numerical data, the examples illustrate applications to any storage container. Accordingly, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system for data allocation based on secure data comparisons, comprising:
    a plurality of intermediaries connected to:
        a data allocator, and
        a plurality of storage containers,
    wherein each intermediary is to:
        receive, from the data allocator, a request to identify a target storage container of the plurality of storage containers, the request including a sparsity number that is indicative of a truncated sparse binary vector representation of a truncated data term, wherein the truncated term is a portion of a data term to be securely allocated to the target storage container, the truncated data term anonymizing the composition of the data term to the each intermediary and including information relevant to the each intermediary, and further wherein anonymizing is performed by removing portions of the sparse binary vector to generate the truncated sparse binary as a vector of smaller length that does not include all of the composition of the data term;
        compare, for a storage container, the truncated data term, represented by the truncated sparse binary vector, with a collection of truncated candidate terms to select a representative term of the candidate terms, wherein the truncated candidate terms are truncated versions of candidate terms representative of each cluster of similar terms in the storage container;
        identify the selected representative term to the storage container;
        receive, from the storage container, a similarity profile representative of similarities between the truncated data term and terms in the storage container, wherein the similarity profile is determined via a similarity score between the truncated data term and the selected representative term; and
        select a candidate target storage container based on similarity profiles received from each storage container.

2. The system of claim 1, wherein the intermediary is to provide, without knowledge of the data term or candidate target storage containers selected by other intermediaries, the selected candidate target storage container to the data allocator.

3. The system of claim 2, wherein the data allocator is to identify the target storage container from the candidate target storage containers.

4. The system of claim 3, wherein the data allocator is to provide the data term to the identified target storage container.

5. The system of claim 4, wherein the data allocator is to:
    determine that a second data term is similar to the data term; and
    provide the second data term to the identified target storage container.

6. The system of claim 1, wherein each intermediary is to select, a candidate cluster of similar terms in the selected target storage container based on the similarity profile received from the target storage container.

7. The system of claim 6, wherein the data allocator is to:
identify a target cluster of similar terms from candidate clusters of similar terms received from the plurality of intermediaries; and
provide the data term to the identified target cluster of similar terms.

8. The system of claim 1, wherein each intermediary is to select the candidate target storage container from a ranked list of storage containers, wherein the ranked list is based on the received similarity profiles.

9. The system of claim 1, wherein the truncated data term and the candidate terms depend on the intermediary.

10. The system of claim 9, wherein the request is to include a hash universe size and a sparsity number, and wherein each intermediary is to:
generate a random permutation based on the request; and
provide the generated random permutation to the data allocator and the plurality of storage containers;
and wherein the truncated versions of the data term and the candidate terms are based on the generated random permutations.

11. A method for data allocation based on secure data comparisons, the method comprising:
receiving, from a data allocator and at each intermediary of a plurality of intermediaries, a request to identify a target storage container of a plurality of storage containers, the request including a sparsity number that is indicative of a truncated sparse binary vector representation of a truncated data term, wherein the truncated data term is a portion of a data term to be securely allocated to the target storage container, the truncated data term anonymizing the composition of the data term to the each intermediary and including information relevant to the each intermediary, and further wherein anonymizing is performed by removing portions of the sparse binary vector to generate the truncated sparse binary vector as a vector of smaller length that does not include all of the composition of the data term;
comparing, at an intermediary and for a storage container, the truncated data term, represented by the sparse binary vector, with a collection of truncated candidate terms to select a representative term of the candidate terms, wherein the truncated candidate terms are truncated versions of candidate terms representative of each cluster of similar terms in the storage container;
identifying, from the intermediary to the storage container, the selected representative term;
receiving, at the intermediary from the storage container, a similarity profile representative of similarities between the truncated data term and terms in the storage container, wherein the similarity profile is determined via a similarity score between the truncated data term and the selected representative term;
selecting, at the intermediary, a candidate target storage container based on similarity profiles received from each storage container; and
providing from the intermediary and without knowledge of the data term or candidate target storage containers selected by other intermediaries, the selected candidate target storage container to the data allocator.

12. The method of claim 11, comprising identifying, at the data allocator, the target storage container from the candidate target storage containers.

13. The method of claim 12, comprising providing the data term to the identified target storage container.

14. The method of claim 12, comprising:
determining, at the data allocator, that a second data term is similar to the data term; and
providing the second data term to the identified target storage container.

15. The method of claim 11, comprising selecting a cluster of similar terms in the target storage container.

16. The method of claim 15, comprising providing, by the data allocator, the data term to the selected cluster of similar terms.

17. A non-transitory computer readable medium comprising executable instructions to:
receive, from a data allocator and at each intermediary of a plurality of intermediaries, a request for identification of a target storage container of a plurality of storage containers to be associated with a data term, the request including a hash universe size and a sparsity number;
generate a random permutation based on the hash universe size;
receive, from the data allocator, a truncated version of the data term, the truncated version of the data term is based on a version of the sparsity number that is indicative of a sparse binary vector representation of the truncated version of the data term and the permutation, and wherein the truncated version of the data term is a portion of the data term, the truncated version of the data term anonymizing the composition of the data term to the each intermediary and including information relevant to the each intermediary, and further wherein anonymizing is performed by removing portions of the sparse binary vector to generate the truncated sparse binary vector as a vector of smaller length that does not include all of the composition of the data term;
receive, from a storage container, truncated versions of a collection of candidate terms, wherein each candidate term represents a cluster of similar terms in the storage container, and wherein the truncated data terms of the candidate terms are based on the sparsity number and the permutation;
compare, for the storage container, the truncated data term with the truncated candidate terms to select a representative term of the candidate terms;
identify, the selected representative term to the storage container; and
receive, from the storage container, a similarity profile representative of similarities between the truncated data term and terms in the storage container, wherein the similarity profile is determined via a similarity score between the truncated data term and the selected representative term.

18. The computer readable medium of claim 17, comprising executable instructions to:
select, at each intermediary, a candidate target storage container based on similarity profiles received from each storage container; and
provide, without knowledge of the data term or candidate target storage containers selected by other intermediaries, the selected candidate target storage container to the data allocator.

19. The computer readable medium of claim 18, comprising executable instructions to:
identify, at the data allocator, the target storage container from the candidate target storage containers; and
provide the data term to the identified target storage container.

20. The computer readable medium of claim 18, comprising executable instructions to:
- identify, at each intermediary, a candidate cluster of similar terms from the candidate target storage container identified by each intermediary; and
- provide, to the data allocator, without knowledge of the data term or candidate clusters of similar terms identified by other intermediaries, the identified candidate cluster of similar terms.

\* \* \* \* \*